(12) United States Patent
Aggarwal et al.

(10) Patent No.: US 11,068,120 B2
(45) Date of Patent: Jul. 20, 2021

(54) VISUALIZATION OF SPENDING DATA IN AN ALTERED REALITY

(71) Applicant: PAYPAL, INC., San Jose, CA (US)

(72) Inventors: Vijeyta Aggarwal, San Jose, CA (US); Michael Charles Todasco, San Jose, CA (US); Kevin Ward, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 89 days.

(21) Appl. No.: 16/407,409

(22) Filed: May 9, 2019

(65) Prior Publication Data

US 2020/0004384 A1 Jan. 2, 2020

Related U.S. Application Data

(63) Continuation of application No. 15/196,829, filed on Jun. 29, 2016, now Pat. No. 10,289,261.

(51) Int. Cl.
| | |
|---|---|
| *G06F 3/0481* | (2013.01) |
| *G06Q 30/06* | (2012.01) |
| *H04L 29/06* | (2006.01) |
| *G06T 11/20* | (2006.01) |
| *G06Q 40/00* | (2012.01) |
| *G06Q 20/10* | (2012.01) |
| *G06Q 20/12* | (2012.01) |
| *G06Q 20/36* | (2012.01) |
| *G06Q 99/00* | (2006.01) |

(52) U.S. Cl.
CPC ......... *G06F 3/0481* (2013.01); *G06Q 20/108* (2013.01); *G06Q 20/12* (2013.01); *G06Q 20/3676* (2013.01); *G06Q 30/0643* (2013.01); *G06Q 40/12* (2013.12); *G06T 11/20* (2013.01); *H04L 67/38* (2013.01); *G06Q 99/00* (2013.01); *G06T 2200/04* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 5,675,746 A | 10/1997 | Marshall | |
| 6,185,582 B1 * | 2/2001 | Zellweger | G06F 40/18 715/212 |
| 6,227,974 B1 | 5/2001 | Eilat et al. | |
| 7,664,830 B2 * | 2/2010 | Rising, III | G06F 16/40 709/218 |
| 8,301,501 B1 | 10/2012 | Glaeser et al. | |
| 8,335,728 B1 | 12/2012 | Dahodwala et al. | |
| 9,251,504 B2 | 2/2016 | Chavez | |
| 9,286,727 B2 | 3/2016 | Kim et al. | |

(Continued)

OTHER PUBLICATIONS

Mehrotra, Y., "Retail Industry Is Evolving—Are You?", Financial Express [New Delhi] Feb. 9, 2016.

*Primary Examiner* — Nicholas D Rosen
(74) *Attorney, Agent, or Firm* — Haynes and Boone, LLP (57) ABSTRACT

Systems, methods, and non-transitory computer readable media for visualizing user spending data in an altered reality are provided. Spending data includes items purchased, budgets for specific rooms or categories, prices paid, dates of purchase, and amounts spent. The user may interact within the altered reality to manage spending and move budgets between rooms or categories.

20 Claims, 8 Drawing Sheets

(56) References Cited

U.S. PATENT DOCUMENTS

| | | |
|---|---|---|
| 9,916,010 B2 | 3/2018 | Harris et al. |
| 10,289,261 B2* | 5/2019 | Aggarwal .............. G06Q 40/12 |
| 2002/0156703 A1 | 10/2002 | Abekawa |
| 2003/0187950 A1* | 10/2003 | Rising, III .............. G06F 16/40 709/218 |
| 2005/0216373 A1 | 9/2005 | Weiss et al. |
| 2006/0047509 A1* | 3/2006 | Ding ....................... G10L 15/24 704/231 |
| 2008/0134056 A1 | 6/2008 | Shuster |
| 2010/0295924 A1 | 11/2010 | Miyatani et al. |
| 2013/0051548 A1 | 2/2013 | Chavez |
| 2014/0214629 A1 | 7/2014 | Azam et al. |
| 2014/0232750 A1 | 8/2014 | Price |
| 2014/0285522 A1 | 9/2014 | Kim et al. |
| 2015/0268728 A1 | 9/2015 | Makela et al. |
| 2015/0294385 A1 | 10/2015 | Grigg et al. |
| 2015/0309705 A1* | 10/2015 | Keeler .................... G06F 3/011 705/27.2 |
| 2015/0379777 A1 | 12/2015 | Sasaki |
| 2016/0093000 A1 | 3/2016 | Pevzner et al. |
| 2016/0109954 A1 | 4/2016 | Harris et al. |
| 2016/0128118 A1 | 5/2016 | Duffell et al. |
| 2016/0140930 A1 | 5/2016 | Pusch et al. |
| 2016/0314451 A1 | 10/2016 | Martin |
| 2017/0039613 A1 | 2/2017 | Kaehler et al. |
| 2017/0046791 A1 | 2/2017 | Runnels et al. |

\* cited by examiner

VISUALIZATION OF SPENDING DATA IN AN ALTERED REALITY

CROSS-REFERENCE TO RELATED APPLICATION

The present application is a continuation of U.S. patent application Ser. No. 15/196,829 filed Jun. 29, 2016 entitled "Visualization of Spending Data in an Altered Reality", now U.S. Pat. No. 10,289,261, the disclosure of which is incorporated by reference herein in its entirety.

BACKGROUND

The present disclosure generally relates to interactive communication systems and, more particularly, to systems and methods to visualize user spending data in an altered reality.

In our fast paced economy, it is sometimes difficult for individuals to manage money and maintain a constant record of their spending. As a result, many often spend too much money or otherwise act irresponsibly with their finances. In addition, overspending can also lead to increased debt and zero savings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF ILLUSTRATIVE EMBODIMENTS

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those ordinarily skilled in the art having the benefit of this disclosure that these concepts may be practiced without these specific details. In some instances, well-known structures and components are shown in block diagrammatical form in order to avoid obscuring such concepts.

The present disclosure provides systems, methods, and non-transitory computer readable media for visualizing and interactively managing user spending data in an altered reality. The altered reality may be a virtual reality, augmented reality, or a combination of the two. The virtual reality is one in which the system replicates a desired environment and simulates a user's physical presence to allow for user interaction within that environment. An augmented reality is a live view of a real-world environment whose elements are augmented (or supplemented) by a system-generated input of sound, video, graphics, data, etc. Using the altered reality view, a user is able to view spending history and budgets based on locations within a house, office, building, or other location. For example, a kitchen view may represent a kitchen budget, such as shown with bills and/or numbers, and items purchased, such as shown by images and/or text. When an item is purchased for the kitchen, the item may appear in the updated altered reality view of the kitchen, and the representation of the kitchen budget may be reduced by the amount of the purchase. As such, the user is able to easily view spend various spending and budgets.

The user is able to interact with the contents of the altered reality to manage spending and budgets. For example, the user may move an item from one "room" to another, which would increase the budget of the room from which the item originated and decrease the budget of the destination room. Images of budget (such as currency or bills) can be moved from room to room to increase and/or decrease budgets as desired. Movement can be with a finger gesture (e.g., a swipe) or eye gesture (e.g., eye movement from one room to another).

The altered reality views of the rooms can correspond to actual rooms or locations associated with the user. For example, a user may have a two-story 3 bedroom, 2 bath house, with a family room, living room, kitchen, garage, and den. The altered reality view may have the same number and designation of rooms in the approximate same layout. Alternatively, the altered reality view may correspond to "fictional" rooms the user creates to correspond to categories of budgets and/or purchases. For example, a user may create rooms for a vacation budget, a clothes budget, a food budget, a bridal shower budget, and a holiday budget. This can be advantageous when it may be difficult to have budgets and/or items allocated to actual rooms or locations associated with the user. Thus, as referenced herein, altered reality of the location (e.g., room, house, etc.) can correspond to an actual physical location or a fictional location.

In a generalized method of the present disclosure, user spending data is acquired by a computer system. The spending data may include, for example, the amount of money spent by the user on certain merchant items, information about the purchased items, date item was purchased, merchant item was purchased from, how the item was purchased (e.g., cash, credit, payments, with coupons, etc.), and the like. After the data is acquired, the system generates a visualization of the spending data in an altered reality. The visualization may be a virtual reality representing a house or other building the user could enter, where each room represents a different spending category. Alternatively, the visualization may be an augmented reality of a room in which the user is presented positioned, whereby merchant items are overlaid with spending data. The visualization is then displayed to the user via some interface such as, for example, GOOGLE® glasses, a mobile device display, or some other interface. For example, the kitchen may include representations of the user's food or grocery spending. Within the altered reality kitchen viewed via the user interface, the user may see stacked money or food, virtual reality representations of SKUs purchased over a time period, money spent compared to others as a scale, or some other altered reality spending visualization. Accordingly, money and other spending-related data is made more user-tangible using altered reality. As a result, the user is able to make more informed financial decisions. In one embodiment, the content appearing in the altered reality display may be interacted with by the user, such as through a swipe or drag and drop action. Such actions may cause other content to be altered, such as budgets, amounts, and items associated with a particular room or location. Thus, the user is able to easily (and more enjoyably) manage and adjust budgets through the interactive altered reality display.

Figure 1:
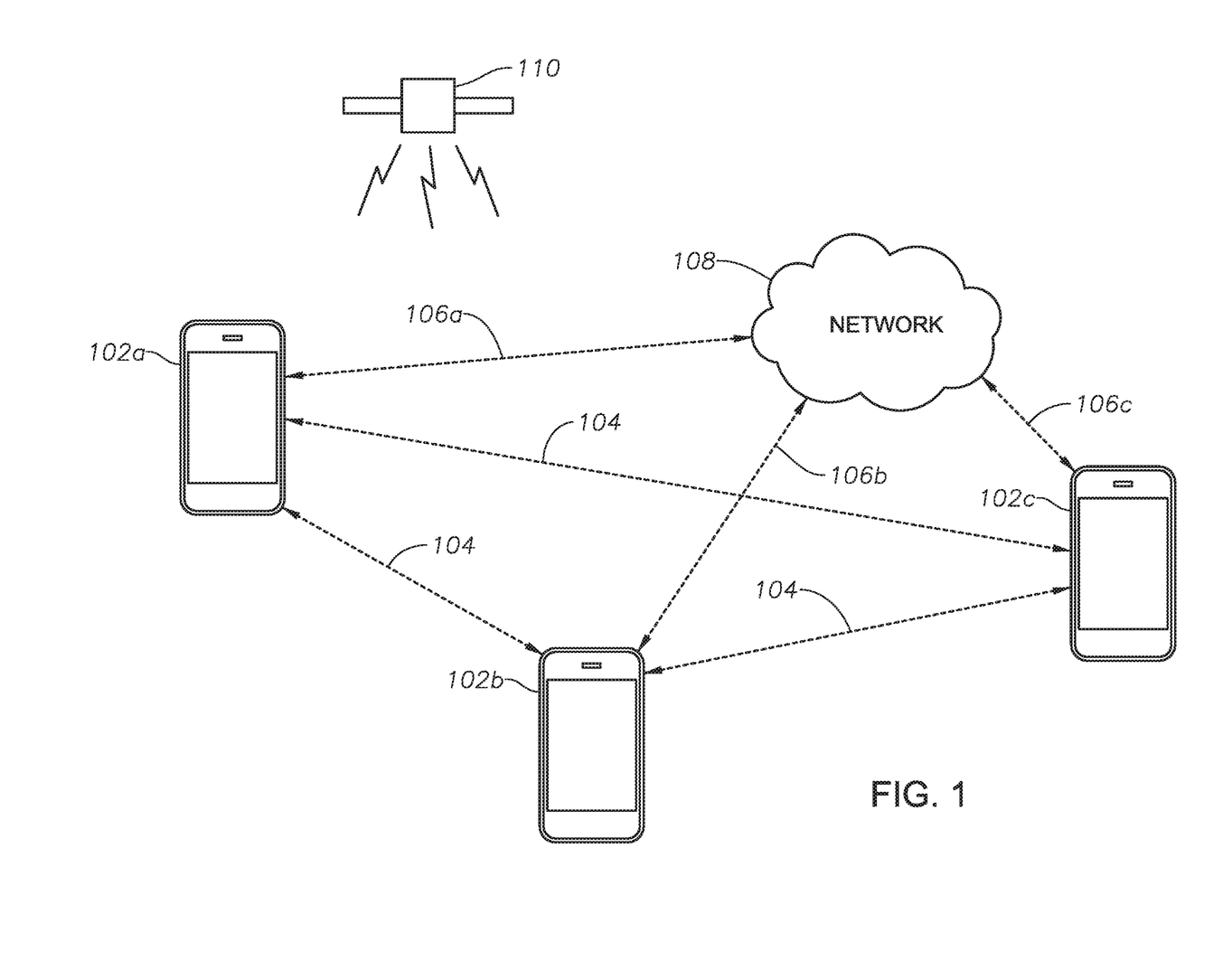
FIG. 1 is a diagram of an illustrative communications environment according to embodiments of the present disclosure.

Referring now to FIG. 1, an embodiment of an exemplary communications environment 100 is illustrated. The communications environment 100 may include a number of mobile communications devices 102, one or more networks 108, and a global navigation satellite system ("GNSS") 110 or other mobile device location detection systems. The communications environment 100 illustrated in FIG. 1 is simplified for the sake of illustration.

The communications environment 100 may support operation on multiple carriers (e.g., waveform signals of different frequencies for wireless communications, or wired communications). As an example, the communications environment 100 may be a multi-carrier LTE network capable of efficiently allocating network resources. The communications environment 100 is one example of a network to which various aspects of the disclosure apply.

The communications environment 100 includes one or more mobile communications devices 102, illustrated in FIG. 1 as mobile communications devices 102a, 102b, and 102c. The mobile communications devices 102a/102b/102c may be, for example, User Equipments ("Ues"). The mobile communications devices 102a/102b/102c may each also be referred to as a terminal, a mobile station, a subscriber unit, etc. A mobile communications device 102 may be a cellular phone, GOOGLE® glasses or some other viewing lens, a smartphone, a personal digital assistant, a wireless modem, a laptop computer, a tablet computer, a tag (e.g., RFID tag), etc., to name just a few examples. The mobile communications devices 102a/102b/102c may be location-aware, for example by including circuitry and/or software to enable the mobile communications devices 102a/102b/102c to determine their own locations.

For example, one or more of the mobile communications devices 102a/102b/102c may include circuitry and/or software that enable them to be in communication with the GNSS 110 in order to determine location. The GNSS 110 may be, for example, the Global Positioning System ("GPS"), Galileo, GLONASS, BeiDou, or some other such system that enables the mobile communications devices 102a/102b/102c to determine geolocation information from signals provided by individual satellites of the GNSS 110. The circuitry and/or software of mobile communications devices 102a/102b/102c may additionally or alternatively enable location determination based on other parameters, such as base station triangulation, time of flight measurements, etc. Location determination may be beneficial to determine where items were purchased. In addition, location determination may aid in presenting the user with an appropriate location view of the altered reality location. For example, if the user is determined, through the user device, to be at the user's work, the altered reality presented to the user may default to the office rooms, as opposed to, say, the user's home.

The mobile communications devices 102a/102b/102c may communicate with each other (as well as other devices) via one or more connections. For example, the mobile communications device 102a may be capable of establishing a peer-to-peer ("P2P") session 104 with one or both of the mobile communications devices 102b and 102c. Similarly, the mobile communications device 102b may be capable of establishing a peer-to-peer session 104 with one or both of the mobile communications devices 102a and 102c. Similarly, the mobile communications device 102c may be capable of establishing a peer-to-peer session 104 with one or both of the mobile communications devices 102a and 102b.

For example, the mobile communications devices 102a/102b/102c may be capable of (e.g., includes one or more associated transceivers for) linking to each other via device-to-device ("D2D") links, such that the P2P sessions 104 may constitute D2D links. As another example, the mobile communications devices 102a/102b/102c may be capable of (e.g., includes one or more associated transceivers for) connecting via Bluetooth or near field communications ("NFC") with each other, to name just a few examples. The mobile communications devices 102a/102b/102c may all establish the same types of P2P sessions 104 with each other (e.g., all using the same linking technology/protocols), or alternatively may use a variety of technologies/protocols in order to establish the P2P sessions 104 in the communications environment 100.

Alternatively, one or more of the mobile communications devices 102a/102b/102c may establish connections to each other via the network 108. For example, the mobile communications device 102a may establish the connection 106a with the network 108, the mobile communications devices 102b may establish the connection 106b with the network 108, and the mobile communications device 102c may establish the connection 106c with the network 108. For example, the mobile communications device 102a may communicate with mobile communications device 102b, via the network 108, by way of the connections 106a and 106b (e.g., the connection 106a constitutes an uplink to the network 108 and the connection 106b a downlink from the network 108). Similarly, the mobile communications device 102 may communicate with mobile communications device 102c, via the network 108, by way of connections 106a and 106c. Similar examples apply with respect to the other mobile communications devices 102b and 102c.

The network 108 may be, for example, a core network, an access network, other network, and/or any combination of networks. The network 108 may include one or more base stations. For example, one or more the base stations may include an evolved Node B ("eNodeB"). A base station may also be referred to as a base transceiver station or an access point. There could be one to many base stations, as well as an assortment of different types such as macro, pico, and/or femto base stations. The base stations may also communicate with one another directly or indirectly, such as via network 108. The network 108 may be an LTE network or a WiFi network, to name just a few examples. The mobile communications devices 102 may use the network 108 to communicate data according to embodiments of the present disclosure. The mobile communications devices 102 may use one or more elements of the network 108 to discover each other, while in other embodiments the mobile communications devices 102 may discover each other through NFC or Bluetooth ad-hoc connections for initial session negotiation and continue communication via NFC or Bluetooth, or alternatively via network 108.

Figure 2:
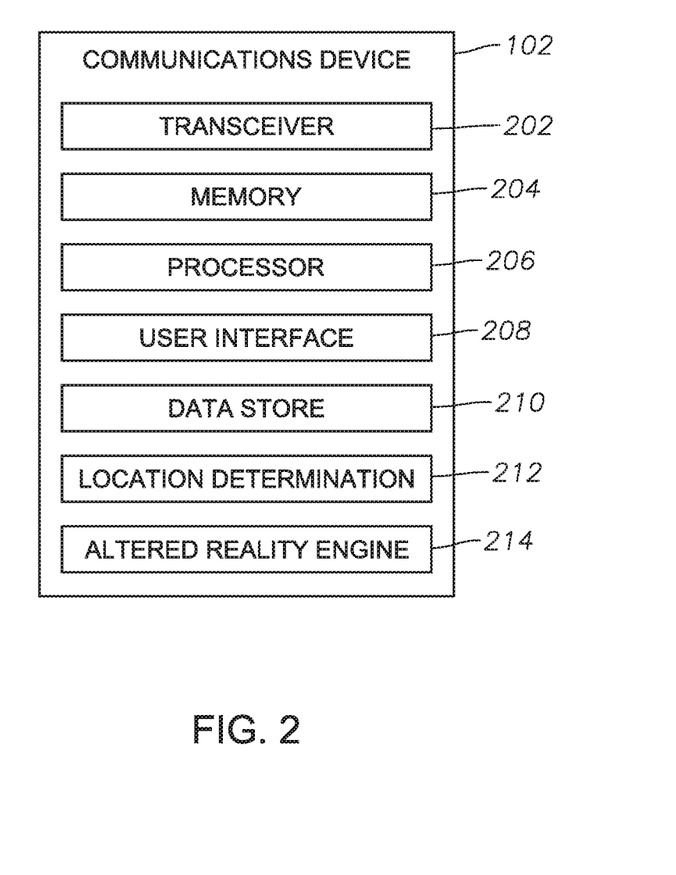
FIG. 2 is a block diagram of an illustrative mobile communications device according to embodiments of the present disclosure.

One exemplary embodiment of the mobile communications devices 102 is depicted in FIG. 2. In FIG. 2, the mobile communication devices 102 include a transceiver 202, a memory 204, a processor 206, a user interface 208, a data store 210, a location determination system 212, and an altered reality engine 214. These elements may be in direct or indirect communication with each other, for example via one or more buses.

The transceiver 202 may include a modem subsystem and a radio frequency ("RF") unit and be configured to communicate bi-directionally with other devices, such as, for example, other mobile communications devices 102, network 108, and/or network database storage locations. The memory 204 may include a cache memory (e.g., a cache memory of the processor 206), random access memory ("RAM"), magnetoresistive RAM ("MRAM"), read-only memory ("ROM"), programmable read-only memory ("PROM"), erasable programmable read only memory ("EPROM"), electrically erasable programmable read only memory ("EEPROM"), flash memory, solid state memory device, hard disk drives, other forms of volatile and non-volatile memory, or a combination of different types of memory. In an embodiment, the memory 204 includes a non-transitory computer-readable medium.

The memory 204 may store instructions that, when executed by the processor 206, cause the processor 206 to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor 206 may include a central processing unit ("CPU"), a digital signal processor ("DSP"), an application-specific integrated circuit ("ASIC"), a controller, a field programmable gate array ("FPGA") device, another hardware device, a firmware device, or any combination thereof configured to perform the operations described herein and discussed in more detail below. The processor 206 may also be implemented as a combination of computing devices, e.g., a combination of a DSP and a microprocessor, a plurality of microprocessors, one or more microprocessors in conjunction with a DSP core, or any other such configuration. The processor 206 may be a single processor or multiple processors, where each processor may have one or more processing cores capable of parallel and/or sequential operation.

The user interface 208 may include an input component and an output component. For example, the user interface 208 may include a touchscreen interface that outputs data for visual use as well as receives/processes one or more touches/swipes/gestures and merchant spending data, etc. to be potentially interpreted according to embodiments of the present disclosure such as discussed with respect to altered reality engine 214. Further, the user interface 208 may be used to display one or more overlays, notifications, elements of information, and application data according to embodiments of the present disclosure. The user interface 208 may also include one or more lights (e.g., LEDs) separate from a touchscreen, a vibration generator, a speaker, a microphone, input for a mouse, input for a keyboard, etc. useful for providing feedback to a user as well as receiving further input therefrom. In yet other embodiments as described below, user interface 208 acts as a screen to display a virtual reality in which spending data is shown, while in other embodiments user interface 208 is a viewing lens through which a user may view an augmented reality having spending data overlaid thereon.

The data store 210 may be, for example, a hard drive, flash drive, storage array, or other type of storage. The data store 210 may store notifications, transferred information, location information, map information, and/or update information (e.g., as an "app"). Moreover, in other embodiments, the data store 210 includes data reflecting the spending of a user at various merchant locations (i.e., user spending data).

In an embodiment, the location determination system 212 may include one or more transceivers to enable communication with the GNSS 110 illustrated in FIG. 1. The mobile communications devices 102a/102b/102c may further include assisted-GPS for enhanced signal acquisition/location quality.

Altered reality engine 214 may include its own processing circuitry or communicate data to/from processor 206 in order to enable visualization of user spending data in an altered reality, as described herein. In general, communications device 102 acquires user spending data from a remote or local storage unit (e.g., data store 210). The spending data reflects money spent on various merchant items (e.g., food, clothing, etc.), as well as money budgeted for certain categories of spending. Once acquired, processor 206, via altered reality engine 214, generates a visualization of the spending data in an altered reality. The altered reality may be a virtual reality or an augmented reality viewed via user interface 208. If a virtual reality is generated, user interface 208 may act as a display screen in which a virtual reality is displayed showing a visualization of the spending data. If an augmented reality is generated, user interface 208 may act as a viewing lens (e.g., GOOGLE® glasses or camera phone display) through which the user views their surrounding environment having their spending data overlaid thereon.

For example, in certain embodiments, the altered reality is a house having a plurality of rooms. Each room of the house represents a different category of spending. The kitchen may represent spending on food items, while the bedrooms represent spending on clothing for different members of the household. The family rooms may include visualizations representing spending on entertainment. The spending data may be visualized as symbols, pictures, or numbers representing the amount a user has spent on items contained in the altered reality, as well as other spending information such as date of purchase, type of purchase (e.g., cash or credit), etc. For example, stacked dollar bills, apples, soda, jeans, shirts, or other items may be used to identify spending on items typically found in the kitchen and bedrooms. The items and/or budget may be for a specific time period, such as the most current month or other designation by the user or system. For example, if the user has a budget for kids toys from January 1 to December 31, purchases throughout the year will be represented in the altered reality. In contrast, if the user also has a budget for a vacation from January 1 to March 31, only purchases and budget representations during that period will be shown.

The spending data may also include funds budgeted for certain categories of spending (i.e., budget data). The budget data may be visualized, which may vary from location to location, within the house or building. Budget data may include currency or other visual content corresponding to the budget amount. Budget data may change based on user input, e.g., the user may have a certain monthly budget for kitchen supplies, which can be changed or kept the same. When items are purchased from a specific budget, that budget data may be adjusted (e.g., decreased by the amount of the purchase). In addition, funds from one budget may be moved to another budget. For example, the user may transfer funds or purchased items from the living room budget to the bedroom budget or vice versa. The transfer may be accomplished using a swipe or drag and drop motion, for example. Once the funds or items have been transferred, the budget data for each room is adjusted accordingly. In certain embodiments, the transfer feature may be visualized as a building (e.g., home) split into a plurality of rooms, along with budget data for each room. The user may then move the budget data from room to room as desired.

With reference back to FIG. 1, different users spending data may be acquired using mobile communications devices 102a-c, P2P sessions 104, and communications links 106. The spending data may be compiled by some central server, then communicated to the various communications devices 102a-c; alternatively, the spending data may be communicated between communications devices 102a-c via P2P sessions 104. Thus, in certain embodiments, the spending data of one or more users may be updated in real-time by the communication devices 102, thus allowing the display of the group spending data in the altered reality in real-time.

In an illustrative method of the present disclosure, a user may purchase an item from a merchant via user interface 208 as part of a payment transaction whereby the communications device 102 is used as a payment terminal. The payment transactions may also take place with the aid of an on-line or mobile payment service provider such as, for example, PayPal, Inc. of San Jose, Calif. Using item identification (e.g., a Stock Keeping Unit ("SKU") number), for example, communications device 102 identifies the item being purchased and the corresponding amount, along with the merchant location. Thereafter, if the item were oranges, communications device 102 generates a virtual reality of a kitchen showing the oranges, along with some representation of the amount spent on oranges and other data as desired, such as date of purchase and where the oranges were purchased. Alternatively, for example, communications device may generate an augmented reality whereby, when the user enters his kitchen and looks at an orange through user interface 208 (e.g., viewing lens), he sees the amount spent on oranges overlaid atop the oranges. Note that while spending data is described herein as amount spent, spending data can also include other information, such as date purchased, merchant name, type of payment used, person's name who made the purchase, etc.

Figure 3A:
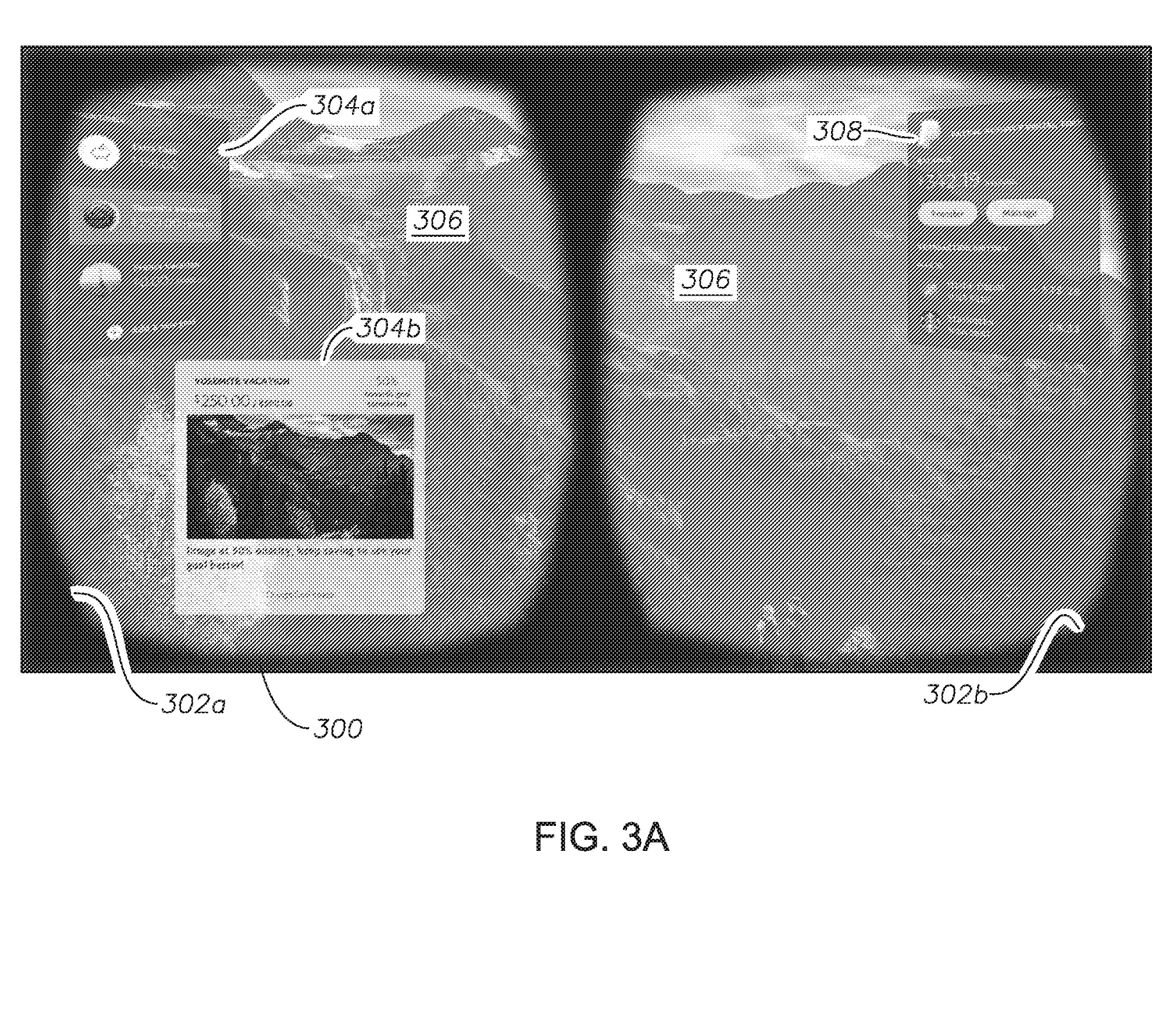
FIG. 3A shows a virtual reality viewed through a viewing lens, according to certain illustrative embodiments of the present disclosure.

FIG. 3A shows a virtual reality viewed through a viewing lens, according to certain illustrative embodiments of the present disclosure. For simplicity of discussion, reference will be made to communications device 102 to include any of mobile communications devices 102a-c from FIG. 1 above, where the mobile communications device 102 is in communication with database storage in network 108 and/or other mobile communications devices 102. This is for simplicity of discussion only. In this example, viewing lens 300 forms part of a communications device 102. Viewing lens 300 may be, for example, a pair of GOOGLE® glasses having lenses 302a and 302b. Here, communications device 102 has generated a virtual reality of a mountain landscape 306 having various types of user spending data visualized therein. In this example, the spending data is visualized as a goals overlay 304a where the user has set a goal to visit Yosemite Park and France. Overlay 304a displays icons showing the user's extra cash of $156.00, $250.00 saved toward the Yosemite vacation, and $0.00 saved toward the France vacation. Also displayed is an overlay 304b which shows that the $250.00 represents 50% of the total costs needed for the Yosemite vacation. In addition, overlay 304b includes a clear image of the mountain landscape, while mountain landscape 306 shown through lenses 302a, b is opaque. In certain embodiments, as the user saves more toward the full costs of the Yosemite vacation, mountain landscape 306 becomes clearer and clearer, thus giving the user a visual confirmation that the financial goal has been met.

Still referring to FIG. 3A, another overlay 308 is used to visualize the balance of the user's account. Here, communications device 102 may be used as a payment terminal having direct access to one or more user accounts. Also, overlay 308 includes icons to transfer money to other accounts (including the vacation accounts) and/or otherwise manage the user's accounts. In addition, overlay 308 includes the transaction history of the displayed account, whereby the user can see his or her spending in real-time. Note, however, that in alternate embodiments, the virtual reality visualization of the spending data of FIG. 3A may be visualized in an augmented reality.

Figure 3B:
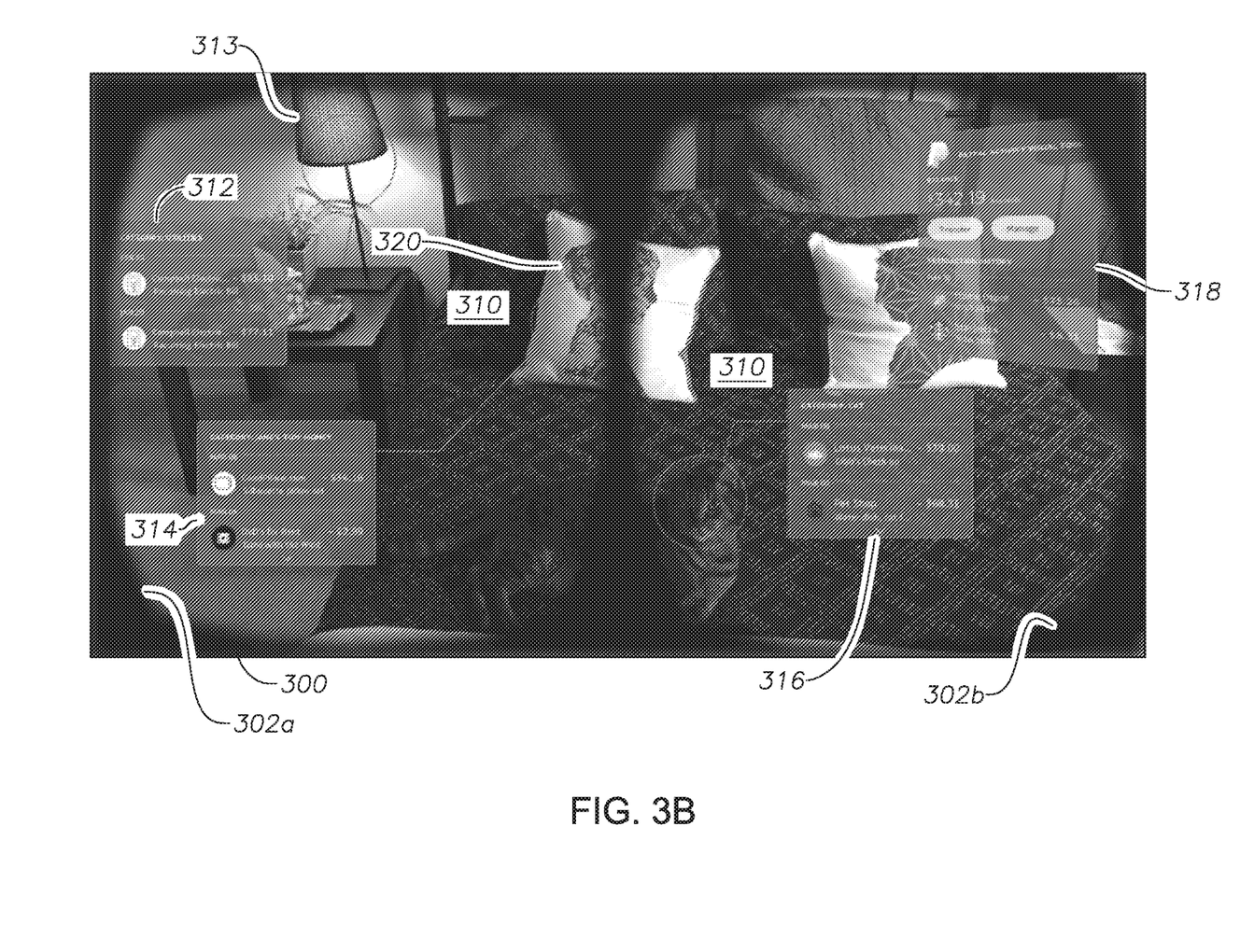
FIG. 3B shows an augmented reality viewed through a viewing lens, according to certain illustrative embodiments of the present disclosure.

FIG. 3B shows an augmented reality viewed through a viewing lens, according to certain illustrative embodiments of the present disclosure. FIG. 3B is similar to FIG. 3A, thus like elements refer to like elements. However, FIG. 3B illustrates an augmented reality 310 of a user's bedroom. Here, for example, the user has entered his house and walked into his bedroom and now views the bedroom through viewing lens 300. A number of overlays are positioned in augmented reality 310. Overlay 312 visualizes spending data corresponding to utility usage. As shown, overlay 312 includes a pointer encircling the bedroom lamp 313. Overlay 312 includes current electric usage for the user of $83.10, in addition to the prior month's electric bill of $77.11. In addition, an overlay 314 visualizes a spending data category corresponding to "Jane's 'Fun' money." Jane has purchased a pillow 320 positioned on the bed using her "Fun money." Overlay 314 includes the date the pillow was purchased, along with the price of $34.16. In addition, overlay 314 also shows money spent on DVDs.

Still referring to FIG. 3B, another overlay 316 points to a cat positioned on the bed. Overlay 316 visualizes the spending data corresponding to the cat, including the price for a checkup at the local vet of $39.00 and the price for a cat water dish of $68.31 (and the name of the merchant). In addition, augmented reality 310 further includes an overlay 318 visualizing spending data related to a user balance of $342.19 in his or her account, along with the transaction history. Various other overlays may be included. As the user scans the room, the overlays may appear automatically or after the user has focused on a certain area in the augmented reality for a defined period of time.

In yet other illustrative embodiments, the spending visualizations may include information to assist the user in reducing spending on items shown in the altered reality. For example, communications device 102 (in FIG. 3B) may generate an overlay listing coupons on cat related items or pillows, in addition to alternative pricing arrangements at other electric providers. In other embodiments, links to financial education videos may also be overlaid into the altered reality. Also, in other embodiments, communications device 102 may generate visualizations of spending data representing the remaining allotment of some amount budgeted by the user. For example, if the user has budgeted $300/mo. on cat-related items, the system will display the amount remaining of that budget (determined by subtracting cat-related items already purchased that month). Other items may be budgeted, such as, for example, athletic wear or shoes. Any variety of spending data that positively or negatively motivates the user to or away from some financial goal, respectively, may be implemented in the present disclosure.

Moreover, in the embodiments of FIG. 3A or 3B, the user may manipulate the overlays (e.g., scroll up/down within an overlay, reposition an overlay, minimize an overlay, etc.) in a variety of ways. For example, the user may move his hand across the augmented reality of FIG. 3B to manipulate the overlays. In a virtual reality-based embodiment, the user may touch the screen to manipulate the overlays. In other embodiments, the user may use various other gestures to manipulate the overlays.

Figure 4A:
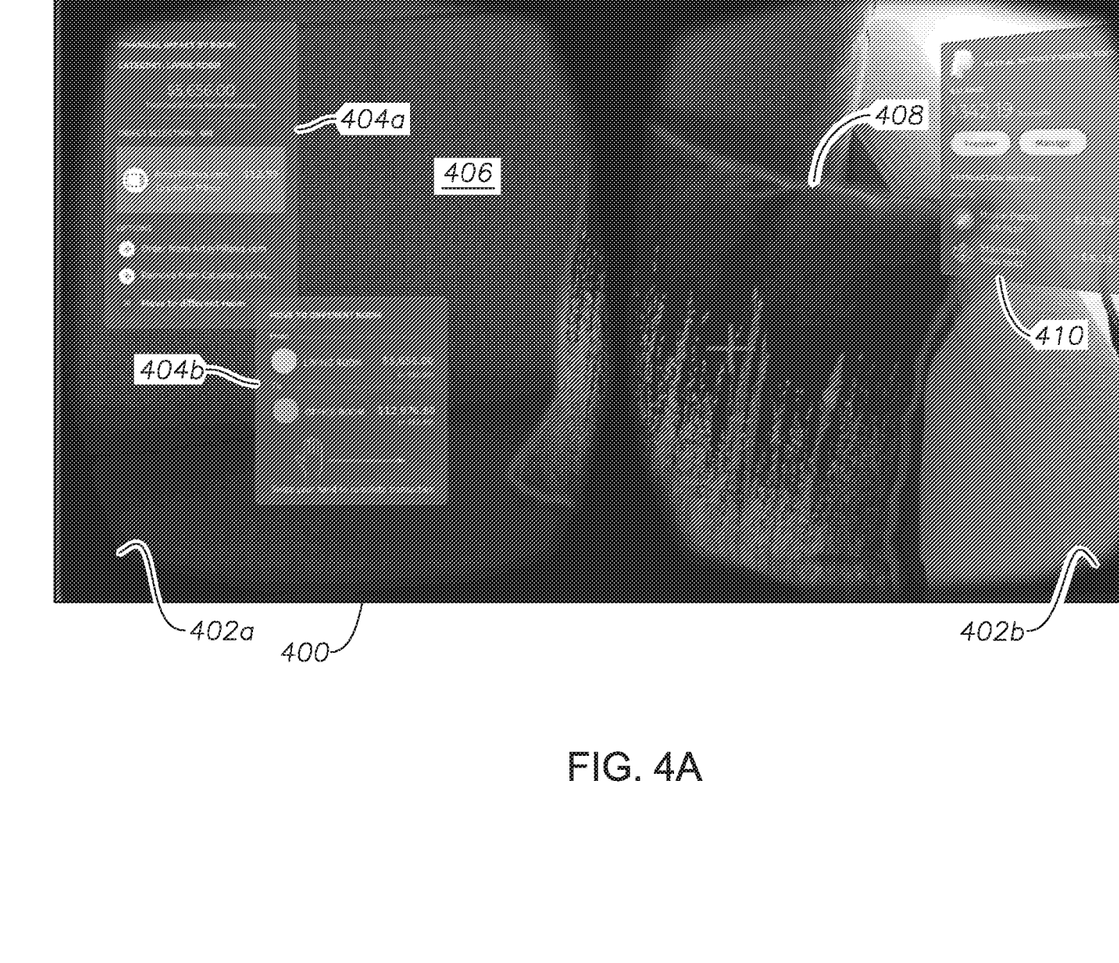
FIG. 4A shows an augmented reality having a spending adjustment feature, according to certain illustrative embodiments of the present disclosure.

FIG. 4A shows an augmented reality viewed through a viewing lens, according to certain illustrative embodiments of the present disclosure. For simplicity of discussion, reference will be made to communications device 102 to include any of mobile communications devices 102a-c from FIG. 1 above, where the mobile communications device 102 is in communication with database storage in network 108 and/or other mobile communications devices 102. This is for simplicity of discussion only.

In this example, viewing lens 400 forms part of a communications device 102. Viewing lens 400 may be, for example, a pair of GOOGLE® glasses having lenses 402a and 402b. Here, through viewing lens 400, a user is viewing a sofa in the living room having a pillow 408 thereon—in augmented reality 406. Communications device 102 has generated an augmented reality of the sofa having various types of user spending data visualized thereon. In this example, the spending data is visualized as a Financial Impact overlay 404a showing a "living room" category and the total cost $5,656 for living room accessories therein. In this example, the user has selected to turn on the "object selection" feature, whereby the user is allowed to focus the cursor on an item and view its spending data. For example, the user may focus the cursor on a blender and see various details about the item, such as the spending category of the blender (e.g., kitchen), amount paid for the blender, data purchased, or current sales on similar blenders. The user may also be given the option of ordering another blender, specifying a shipping address, reorganizing a category listing, or moving funds or the item to another category or room. In certain other embodiments, the system may generate a popup saying "sell on eBay" or "sell on Craig's List," etc., which would allow the user to list the blender for sale on these or similar sites. In the illustrated example, since pillow 408 is being viewed through lens 400, overlay 404a includes an icon showing the price $12.99 for pillow 408, along with the website where it was purchased (ArtsyPillows.com/Gradient Pillow). Below this icon is an option menu whereby the user can choose whether to order something from ArtsyPillows.com or to remove the order from the living room category.

Still referencing FIG. 4A, overlay 404a also gives the user the choice to move items or funds from room to room. As seen at the bottom of overlay 404a, an icon is shown as "move to different room." When selected, a corresponding overlay 404b appears entitled "move to different room."

Overlay 404b provides the ability to move an item (e.g., ArtsyPillows.com pillow) from the living room to the office room. In addition, the system adjusts the budgets (i.e., spending data) amount $5,656 and $12,976.80, respectively, of the living room and office room to take into account the price of the pillow. In certain alternative embodiments, funds corresponding to the remaining budgeted allotment (or a portion thereof) for a certain room may be transferred to another room. Although the transfer of one item or funds from room to room may be accomplished in a variety of ways, in this example, the transfer is accomplished by a hand swipe in a defined direction. In addition, augmented reality 406 further includes an overlay 410 visualizing spending data related to a user balance of $342.19 in his or her account, along with the transaction history, as previously described.

Figure 4B:
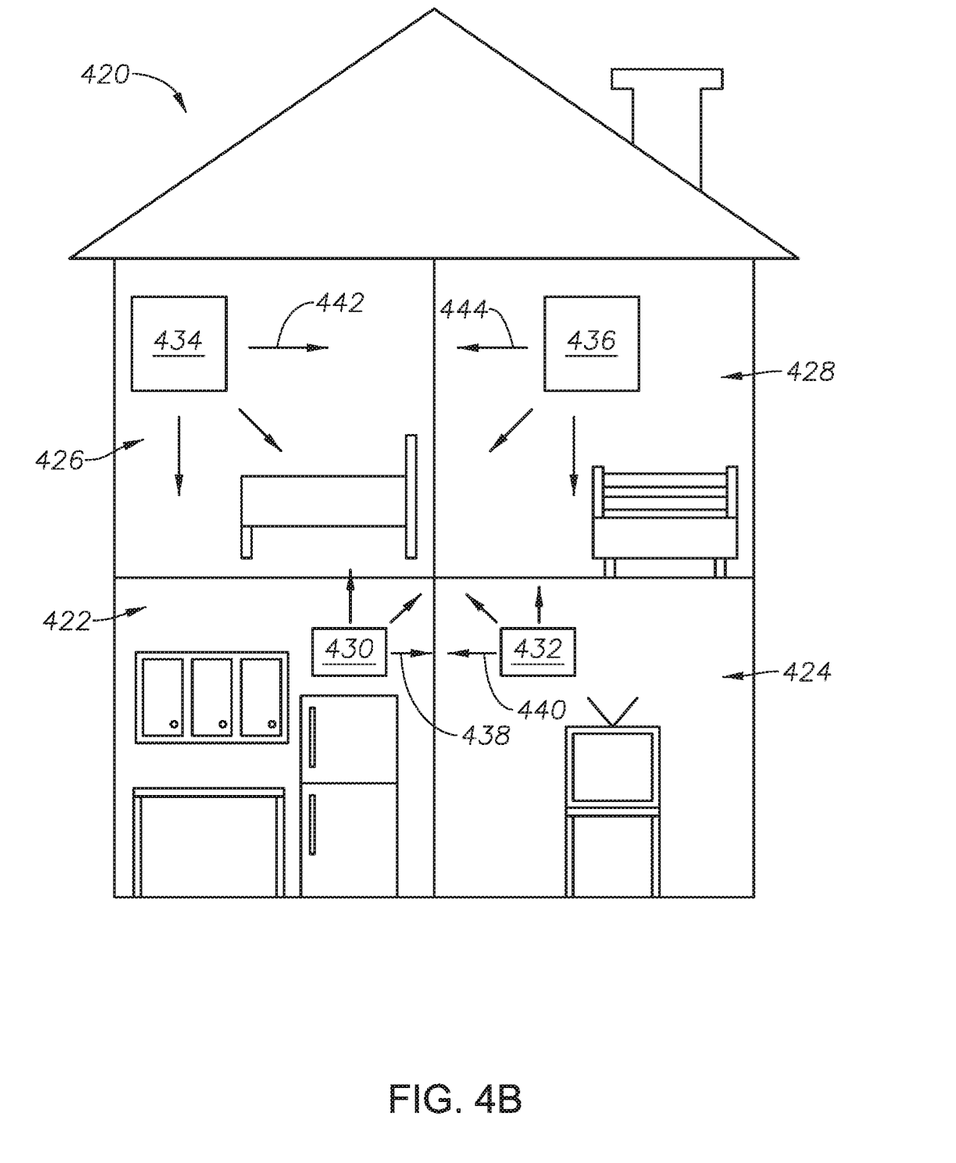
FIG. 4B shows a virtual reality having a spending adjustment feature, according to certain illustrative embodiments of the present disclosure.

FIG. 4B shows a virtual reality viewed through a user interface, according to certain illustrative embodiments of the present disclosure. In this example, the user interface may be a touch screen of a mobile device. Nevertheless, a virtual house 420 is shown having 4 separate rooms. Room 422 represents a kitchen, room 424 represents a living room, room 426 represents a bedroom, and room 428 represents another bedroom. A number of overlays 430, 432, 434, and 436 are used to visualize the spending data in each respective room. The overlays 430-436 may take a variety of forms as described herein, such as, for example, overlays 404a and 404b of FIG. 4A. Here, each overlay 430-436 may be moved to any other room in like manner to that of FIG. 4A, whereby the system then adjusts the spending data of each room respectively. Arrows 438 represent the movement directions of overlay 430, arrows 440 represent the movement directions of overlay 432, arrows 442 represent the movement directions of overlay 434, and arrows 444 represent the movement directions of overlay 436. The movement may be accomplished in a variety of ways, including, for example, a touch gesture or hand swipe motion.

Figure 5:
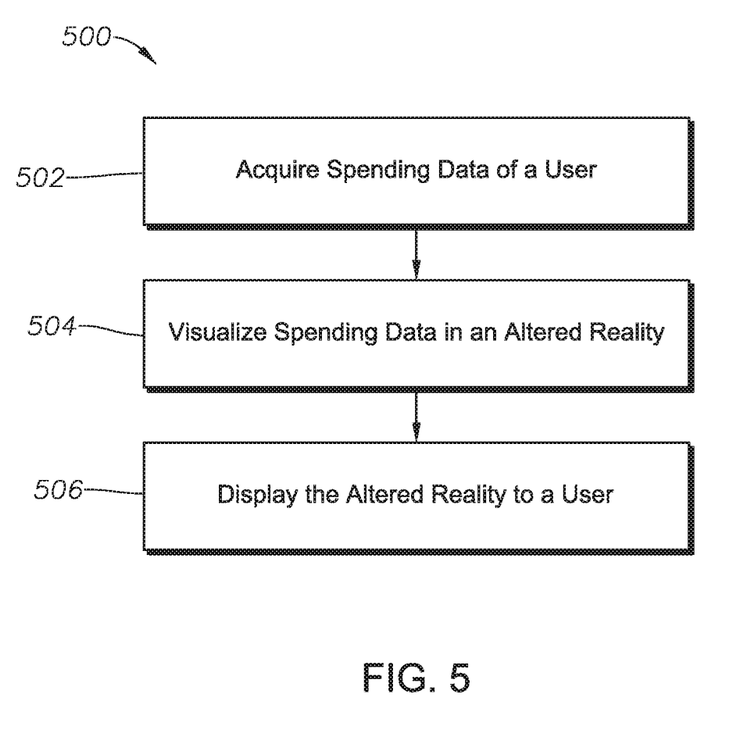
FIG. 5 is a flow chart of a method to assist a user in making informed financial decisions, according to certain illustrative methods of the present disclosure.

Turning now to FIG. 5, a flow chart illustrates a method 500 that assists a user in making informed financial decisions, according to certain illustrative methods of the present disclosure. Method 500 will be described with respect to a mobile communications device 102 for simplicity of discussion. It is understood that additional steps can be provided before, during, and after the steps of method 500, and that some of the steps described can be replaced or eliminated for other embodiments of the method 500.

At block 502, mobile communications device 102 establishes a merchant transaction session whereby spending data is acquired from a user. The spending data corresponds to one or more purchased items and may be acquired in a variety of ways, such as, for example, when mobile communications device 102 is used as a payment terminal, as described herein. Once the spending data is acquired, the device determines a category in which the item belongs. For example, if mouthwash were purchased, the device determines this belongs in the bathroom category. Thereafter, the device accesses or generates an altered reality of the user's home, for example. Once accessed, the device then determines the sub-location inside the home corresponding to mouthwash is the bathroom. At block 504, mobile communications device 102 (or some remote processor) then generates a visualization of the spending data in the altered reality (e.g., the bathroom). The visualization may be a virtual or augmented reality, for example, having spending data visualized therein.

The visualization may be a room in a building, such as a house, wherein the spending data for items in each respective room is displayed at block 506. The user spending data may be historical or real-time data, and may be comprised of individual data or group data (e.g., family spending). In the latter example, as family members spend on various household items, the system automatically updates the spending data for each room so that each member may view the data on their respective communications devices. Accordingly, each user is provided information to assist them in making more informed financial decisions. The visualization may be for certain time periods, such as the current month, the current year, or any other time period specified by the user. Items that are sold or returned may also be indicated and spending data adjusted accordingly, such as by adding back an amount equal to the sale or return.

Figure 6:
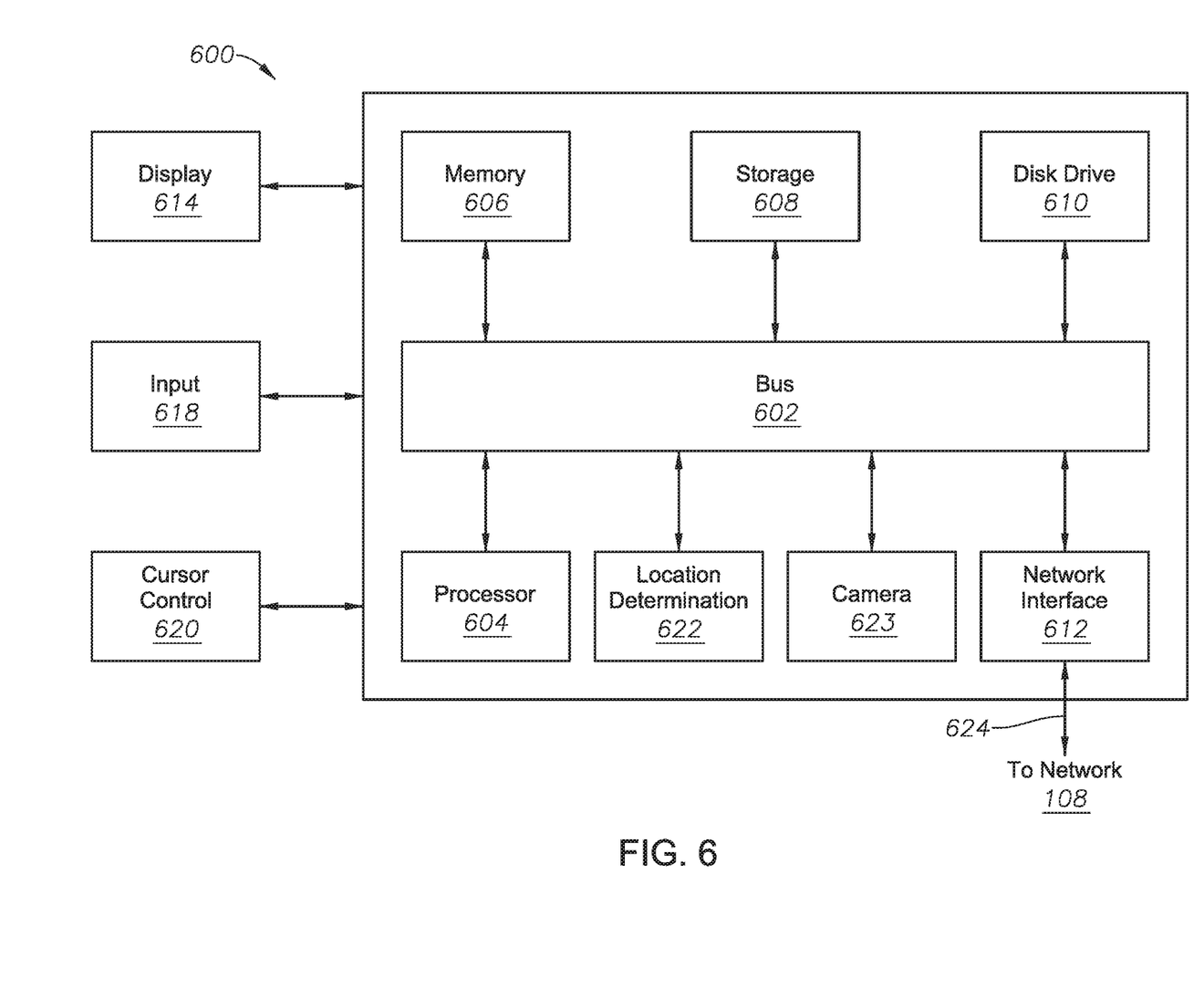
FIG. 6 is a schematic view illustrating an embodiment of a computing system for use with the present disclosure.

Referring now to FIG. 6 an embodiment of a computer system 600 suitable for implementing, for example, the mobile communications devices, mobile or other user devices, servers, etc., is illustrated. It should be appreciated that other devices utilized by users, payment service providers, point of sale operators, and/or merchants/stores in the system discussed above may be implemented as the computer system 600 in a manner as follows.

In accordance with various embodiments of the present disclosure, computer system 600, such as a mobile device, computer and/or a server, includes a bus 602 or other communication mechanism for communicating information, which interconnects subsystems and components, such as a processing component 604 (e.g., processor, micro-controller, DSP, etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT or LCD), an input component 618 (e.g., keyboard, keypad, or virtual keyboard), a cursor control component 620 (e.g., mouse, pointer, or trackball), a location determination component 622 (e.g., a Global Positioning System (GPS) device as illustrated, a cell tower triangulation device, and/or a variety of other location determination devices known in the art), and/or a camera component 623. In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the mobile communications devices, mobile devices, and/or servers. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 606, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 624 to the network 108 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 624 and the network interface component 612. The network interface component 612 may include an antenna, either separate or integrated, to enable transmission and reception via the communication link 624. Received program code may be executed by processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art having the benefit of this disclosure will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
acquiring spending data corresponding to an item visualized in a user interface;
accessing an altered reality of a location associated with the item, wherein the altered reality comprises an interactive visual within the altered reality for the location associated with the item, and wherein the location comprises a plurality of actual rooms of a building;
determining a sub-location within the location that corresponds to a category of the item, wherein the sub-location comprises one of the plurality of actual rooms;
generating a visualization of the spending data in the altered reality for the sub-location, including an option to buy or sell the item within the sub-location using the interactive visual within the altered reality;
displaying the altered reality via the user interface;
receiving a user input to the interactive visual via the user interface displaying the altered reality; and
adjusting the spending data for the sub-location based on the user input.

2. The system of claim 1, wherein each of the plurality of actual rooms represent a spending category associated with the building.

3. The system of claim 2, wherein the operations further comprise:
moving the item from one of the plurality of actual rooms to another one of the plurality of actual rooms via the user interface; and
adjusting the spending data in each of the plurality of actual rooms based on the moving.

4. The system of claim 3, wherein prior to the moving, the operations further comprise:
detecting a finger gesture on the item or an eye gesture on the item,
wherein the moving is based on the detecting.

5. The system of claim 2, wherein the plurality of actual rooms further corresponds to user-created rooms in the altered reality that are associated with different budget types.

6. The system of claim 1, wherein the altered reality is at least one of a virtual reality or an augmented reality.

7. The system of claim 1, wherein the interactive visual comprises at least one of:
a symbol, a picture, or a number representing an amount a user has spent on items visualized in the altered reality;
a time period corresponding to the spending data;
a merchant name corresponding to the spending data;
a payment type used that corresponds to the spending data; or
user identification data.

8. The system of claim 1, wherein the visualization further comprises budget content associated with reducing a spending on items visualized in the altered reality.

9. The system of claim 1, wherein the visualization of the spending data includes a remaining allotment of a budgeted amount.

10. The system of claim 1, wherein the operations further comprise:
providing a cursor for a selection of the item in the user interface.

11. The system of claim 1, wherein the spending data further comprises a savings goal associated with the building, and wherein the visualization comprises the savings goal displayed with the interactive visual.

12. A non-transitory computer-readable medium having stored thereon machine-readable instructions executable to cause a machine to perform operations comprising:
determining a category of an item corresponding to spending data;
accessing an altered reality of a location associated with the item, wherein the altered reality comprises an interactive visual within the altered reality for the location associated with the item, and wherein the location comprises a plurality of physical rooms of a building;
determining a sub-location, within the location, that corresponds to the category, wherein the sub-location comprises one of the plurality of physical rooms;
generating a visualization of the spending data and the item in the altered reality using the interactive visual within the altered reality;
displaying the altered reality with the visualization and a visual indication to buy or sell the item via a user interface;
receiving user input to the interactive visual via the user interface displaying the altered reality; and
adjusting the spending data for the sub-location based on the user input.

13. The non-transitory computer-readable medium of claim 12, wherein the sub-location comprises one of the plurality of physical rooms corresponding to the category.

14. The non-transitory computer-readable medium of claim 13, wherein the operations further comprise:
moving the item from one of the plurality of physical rooms to another one of the plurality of physical rooms via the user interface; and
adjusting spending data in each of the plurality of physical rooms based on the moving.

15. The non-transitory computer-readable medium of claim 12, wherein the visualization further comprises budget information associated with reducing a spending on items visualized in the altered reality.

16. The non-transitory computer-readable medium of claim 12, wherein the operations further comprise:
providing a cursor for a selection of the item within the user interface.

17. The non-transitory computer-readable medium of claim 12, wherein the altered reality is displayed through a wearable viewing lens in real-time.

18. A method, comprising:
acquiring spending data of a user corresponding to an item indicated in a user interface;
determining a category of the item;
accessing an altered reality of a location associated with the item, wherein the altered reality comprises an interactive visual within the altered reality for the location associated with the item, and wherein the location comprises a plurality of rooms;
determining a sub-location, within the location of the user, that corresponds to the category of the item, wherein the sub-location comprises one of the plurality of rooms;
displaying a visualization of the spending data in the altered reality for the sub-location using the interactive visual within the altered reality, including the sub-location and a prompt to buy or sell the item, to the user via the user interface;
receiving user input to the interactive visual via the user interface displaying the altered reality; and
adjusting the spending data for the sub-location based on the user input.

19. The method of claim 18, wherein the spending data corresponds to a first room of the plurality of rooms in which the item is located, wherein the plurality of rooms correspond to a building, and wherein the method further comprises:
moving the item from the first room to another one of the plurality of rooms via the user interface; and
adjusting the spending data in each of the plurality of rooms based on the moving.

20. The method of claim 18, wherein the altered reality includes portions of a residence of the user, and wherein the visualization of the spending data is displayed over a view of the portions of the residence.

* * * * *